US011322987B2

(12) United States Patent
Nakao

(10) Patent No.: US 11,322,987 B2
(45) Date of Patent: May 3, 2022

(54) ELECTRIC POWER TRANSMISSION APPARATUS, WIRELESS ELECTRIC POWER SUPPLY SYSTEM, AND ELECTRIC POWER TRANSMISSION METHOD

(71) Applicant: KYOCERA Corporation, Kyoto (JP)

(72) Inventor: Masaki Nakao, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 214 days.

(21) Appl. No.: 16/522,665

(22) Filed: Jul. 26, 2019

(65) Prior Publication Data
US 2020/0036231 A1 Jan. 30, 2020

(30) Foreign Application Priority Data
Jul. 27, 2018 (JP) .............................. JP2018-141659

(51) Int. Cl.
*H02J 7/00* (2006.01)
*H02J 50/20* (2016.01)
(Continued)

(52) U.S. Cl.
CPC .............. *H02J 50/20* (2016.02); *H02J 7/025* (2013.01); *H02J 50/80* (2016.02)

(58) Field of Classification Search
CPC ........... H02J 13/00017; H02J 13/00007; H02J 13/00; H02J 3/14; H02J 50/10; H02J 50/20; H02J 7/025; H02J 13/00009; H02J 50/15; H02J 50/23; H02J 50/40; H02J 50/60; H02J 50/80; H02J 50/90; H02J 13/00022; H02J 13/00024; H02J 13/00026; H02J 13/00028; H02J 13/0075; H02J 5/005; H02J 50/001; H02J 50/05; H02J 50/27; H02J 50/402; H02J 7/00034; H02J 1/00; H02J 13/0082; H02J 13/0086; H02J 2300/24; H02J 2300/28; H02J 3/02; H02J 3/38;
(Continued)

(56) References Cited

U.S. PATENT DOCUMENTS 9,825,674 B1 * 11/2017 Leabman ................ H02J 50/20
9,887,739 B2 * 2/2018 Leabman ................ H02J 50/23
(Continued)

FOREIGN PATENT DOCUMENTS

JP 2014-223018 A 11/2014

*Primary Examiner* — Binh C Tat
(74) *Attorney, Agent, or Firm* — Hauptman Ham, LLP

(57) ABSTRACT

An electric power transmission apparatus comprises a first antenna, a storage medium, and at least one first processor. The at least one first processor is configured to cause the first antenna to output a second radio wave for electric power supply in response to a request signal, when a first radio wave including the request signal is received from an electric power reception apparatus via the first antenna. The at least one first processor is configured to store information about an electric power transmission condition of the second radio wave transmitted in response to the request signal in the storage medium as history information. The at least one first processor is configured to cause the first antenna to output the second radio wave with the electric power transmission condition based on the history information, irrespective of whether or not the first radio wave has been received.

9 Claims, 8 Drawing Sheets

(51) Int. Cl.
*H02J 50/80* (2016.01)
*H02J 7/02* (2016.01)

(58) Field of Classification Search
CPC .. H02J 3/381; H02J 3/383; H02J 3/386; H02J 3/46; H02J 50/12; H02J 7/00045; H02J 7/0013; H02J 7/0027; H02J 7/35; H01P 5/026; H01P 7/08; H01Q 13/10; H01Q 21/00; H01Q 21/22; H01Q 25/00; H01Q 9/04
USPC .................................................. 320/106–115
See application file for complete search history.

(56) References Cited

U.S. PATENT DOCUMENTS

2010/0315045 A1    12/2010  Zeine
2015/0028690 A1*  1/2015   Sako ...................... H02J 3/007
                                                          307/104

\* cited by examiner

ELECTRIC POWER TRANSMISSION APPARATUS, WIRELESS ELECTRIC POWER SUPPLY SYSTEM, AND ELECTRIC POWER TRANSMISSION METHOD

CROSS-REFERENCE TO RELATED APPLICATION

The present application claims priority under 35 U.S.C. § 119 to Japanese Patent Application No. 2018-141659, filed on Jul. 27, 2018, entitled "ELECTRIC POWER TRANSMISSION APPARATUS, WIRELESS ELECTRIC POWER SUPPLY SYSTEM, AND ELECTRIC POWER TRANSMISSION METHOD", the content of which is incorporated by reference herein in its entirety.

FIELD

Embodiments of the present disclosure relate generally to an electric power transmission apparatus, a wireless electric power supply system, and an electric power transmission method.

BACKGROUND

As described in Japanese Patent Application Laid-Open No. 2014-223018, a technology of supplying electric power from an electric power transmission apparatus to an electric power reception apparatus by using radio waves has been known.

SUMMARY

An electric power transmission apparatus and an electric power transmission method are disclosed. In one embodiment, an electric power transmission apparatus comprises a first antenna, a storage medium, and at least one first processor. The at least one first processor is configured to cause a first antenna to output a second radio wave for electric power supply in response to an electric power transmission request signal, when a first radio wave including the electric power transmission request signal is received from an electric power reception apparatus via the first antenna. The at least one first processor is configured to store information about an electric power transmission condition of the second radio wave transmitted in response to the electric power transmission request signal in the storage medium as history electric power transmission information. The at least one first processor is configured to cause the first antenna to output the second radio wave with the electric power transmission condition based on the history electric power transmission information, irrespective of whether or not the first radio wave has been received.

An electric power transmission method comprises the following. A first antenna is caused to output a second radio wave for electric power supply in response to an electric power transmission request signal, when a first radio wave including the electric power transmission request signal is received from an electric power reception apparatus via the first antenna. Information about an electric power transmission condition that is used when the second radio wave is transmitted in response to the electric power transmission request signal is stored in a storage medium as history electric power transmission information. The first antenna is caused to output second radio wave with the electric power transmission condition based on the history electric power transmission information, irrespective of whether or not the first radio wave has been received.

DETAILED DESCRIPTION

Figure 1:
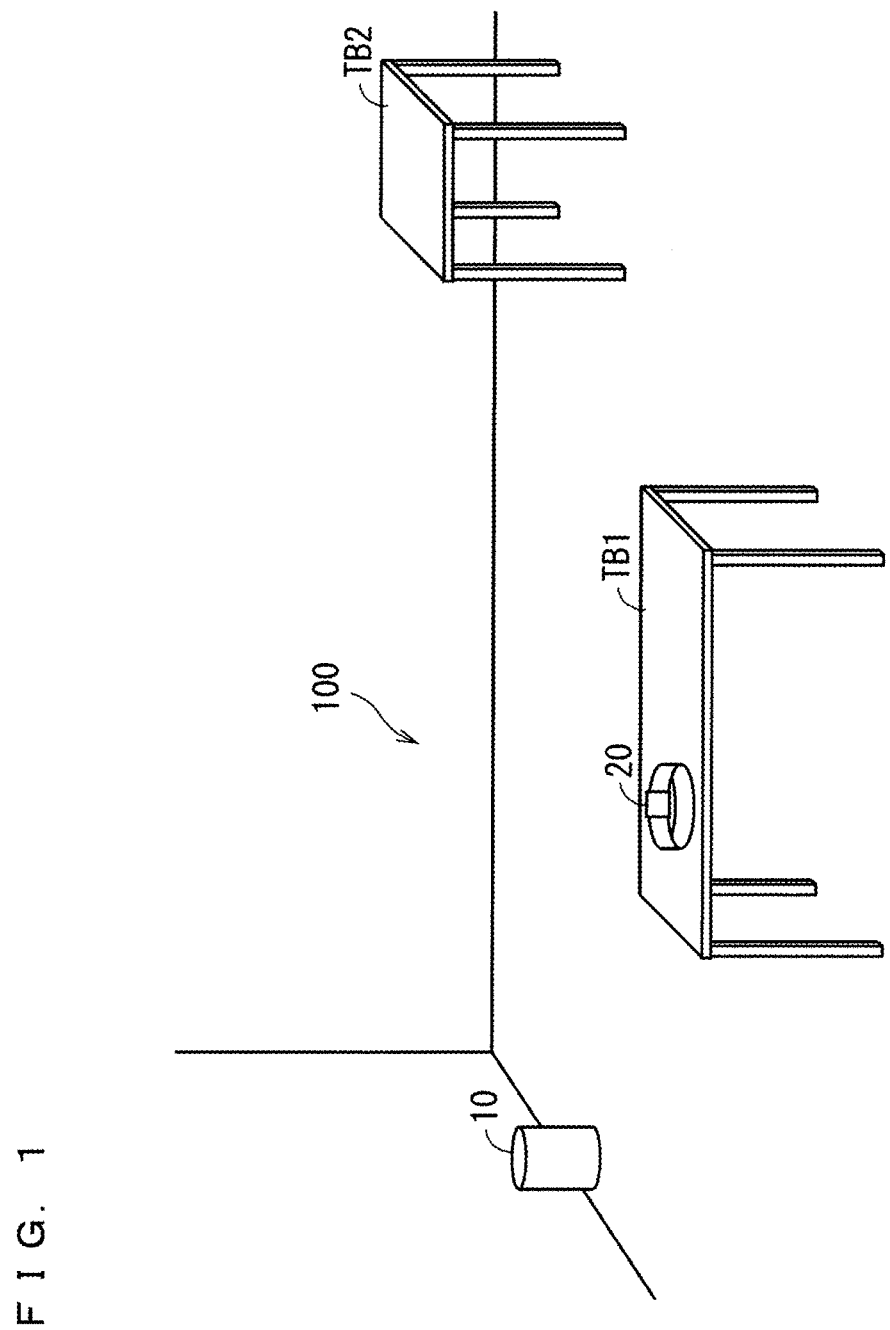
FIG. 1 illustrates a diagram schematically illustrating one example of a configuration of a wireless electric power supply system.

FIG. 1 illustrates a diagram schematically illustrating one example of a configuration of a wireless electric power supply system 100. The wireless electric power supply system 100 comprises an electric power transmission apparatus 10 and an electric power reception apparatus 20. As illustrated in FIG. 1, the electric power transmission apparatus 10 may be located in a room. For example, the electric power transmission apparatus 10 receives electric power through an electrical outlet located on a side wall or the like of a room, and operates based on the electric power. The electric power transmission apparatus 10 can output radio waves EW1 for electric power supply to the surroundings.

For example, the electric power reception apparatus 20 is a portable electronic apparatus. More specific examples of the electric power reception apparatus 20 include a portable electronic apparatus, such as a smartphone, a personal digital assistant (PDA), and a portable music player, or a wearable electronic apparatus worn by a user, such as a wristwatch-type wearable electronic apparatus and an eyeglass-type wearable electronic apparatus. In one example of FIG. 1, a placement member (e.g., a table) TB1 and a placement member TB2 are installed in a room. The electric power reception apparatus 20 is placed on one of the placement members, i.e., placed on the placement member TB1. Note that the user can place the electric power reception apparatus 20 at any position in a room. For example, the user can place the electric power reception apparatus 20 on the placement member TB2.

As will be illustrated later, the electric power reception apparatus 20 comprises a battery 24. The electric power reception apparatus 20 can receive the radio waves EW1 from the electric power transmission apparatus 10. The electric power reception apparatus 20 can generate electric power from the radio wave EW1, and can charge the battery 24 based on the electric power.

Figure 2:
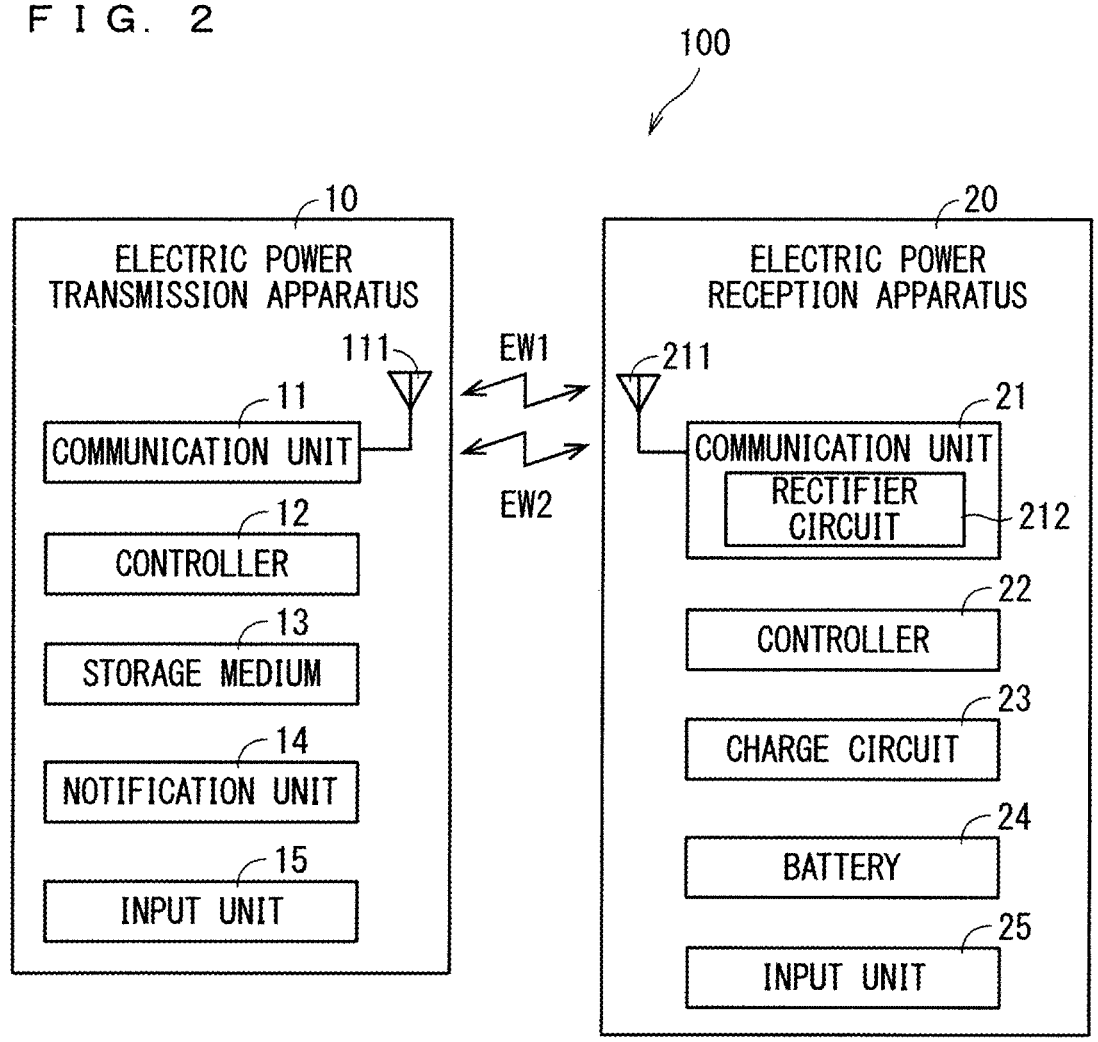
FIG. 2 illustrates a diagram schematically illustrating one example of an electrical configuration of the wireless electric power supply system.

FIG. 2 illustrates a functional block diagram schematically illustrating one example of an electrical configuration of the wireless electric power supply system 100. As illustrated in FIG. 2, the electric power reception apparatus 20 comprises a communication unit 21, a controller 22, a charge circuit 23, a battery 24, and an input unit 25.

The communication unit (communication circuit) 21 comprises an antenna 211 and a rectifier circuit 212. The antenna 211 can transmit and receive radio waves to and from the electric power transmission apparatus 10. The antenna 211 may comprise an array antenna comprising a plurality of antenna elements. The rectifier circuit 212 may consist only of passive components, such as a diode. As such a circuit 212, for example, a diode half-wave rectifier circuit, a diode full-wave rectifier circuit, or the like can be adopted.

The antenna 211 can receive the radio wave EW1 for electric power supply output from the electric power transmission apparatus 10, and can output an AC voltage to the rectifier circuit 212, based on the radio wave EW1. The rectifier circuit 212 can rectify an AC voltage that is output from the antenna 211 into a DC voltage. A combination of the antenna 211 and the rectifier circuit 212 may also be referred to as a rectenna. The communication unit 21 outputs a DC voltage that is output from the rectifier circuit 212 to the charge circuit 23.

The charge circuit 23 can charge the battery 24, based on the DC voltage. The charge circuit 23 converts an input from the rectifier circuit 212 into an output suitable for charging, and supplies the output to the battery 24. For example, the electric power reception apparatus 20 may comprise a sensor (not shown) that detects an output (at least any one of a voltage and an electric current) of the charge circuit 23. The sensor outputs an electric signal indicating a detected value of the output to the charge circuit 23. The charge circuit 23 controls the output so that the detected value of the output comes closer to a target value (value suitable for charging).

The communication unit 21 can output the radio wave EW1 from the antenna 211 to the surroundings. For example, the communication unit 21 can output the radio wave EW1 substantially in all directions from the antenna 211. The radio wave EW1 is received by the electric power transmission apparatus 10. The radio wave EW1 is used by the electric power transmission apparatus 10 to estimate the position of the electric power reception apparatus 20. The radio wave EW1 need not be used as electric power by the electric power transmission apparatus 10.

Note that the radio wave EW1 for electric power supply need not include an electric signal. Thus, regarding the radio wave EW1, the expressions "transmit" and "receive," which are often used to imply transmission and reception of an electric signal, are not used, and expressions of hypernyms are adopted instead.

The communication unit 21 can receive radio waves EW2 for communication via the antenna 211. The radio waves EW2 for communication are transmitted from the electric power transmission apparatus 10. The communication unit 21 can perform various types of processing, such as amplification processing, on a signal that the communication unit 21 receives from the antenna 211. Then, the communication unit 21 can output the processed signal to the controller 22. The controller 22 performs various types of processing on the signal that the controller 22 receives, and recognizes information included in the received signal. The communication unit 21 can perform various types of processing, such as amplification processing, on a signal transmitted from the controller 22 to the communication unit 21. Then, the communication unit 21 can transmit radio waves EW2 superimposed by the processed signal from the antenna 211 to the electric power transmission apparatus 10.

As a standard of wireless communication between the electric power transmission apparatus 10 and the electric power reception apparatus 20 using the radio wave EW2, a standard of short-range wireless communication can be adopted, for example. As the standard of short-range wireless communication, for example, a standard such as Bluetooth (trademark) and WiFi (trademark) can be adopted.

The antenna 211 may comprise an antenna that can be used for both of the radio wave EW1 and the radio wave EW2, or may separately comprise an antenna dedicated to the antenna EW1 and an antenna dedicated to the radio wave EW2. The antenna 211 may comprise an antenna for transmission and reception, or may separately comprise an antenna dedicated to transmission (output) and an antenna dedicated to reception (electric power reception).

A DC voltage of the battery 24 is input to the controller 22. When the remaining amount of the battery 24 is equal to or greater than a minimum value, the controller 22 can use the DC voltage of the battery 24 as an operating voltage to perform operation. In other words, in a state in which the remaining amount of the battery 24 is less than the minimum value (hereinafter referred to as a dead battery state), the controller 22 cannot be activated and thus cannot perform operation. Note that the dead battery state includes a state in which an apparatus without a charge function does not receive electric power. Examples of the apparatus without a charge function include an apparatus that receives electric power only through radio waves, and an apparatus that generates electric power with sunlight. The apparatus without a charge function need not comprise wired electric power reception means.

However, even when the electric power reception apparatus 20 is in a dead battery state, the communication unit 21 can output a DC voltage based on the radio wave EW1 to the charge circuit 23. This is because an output of the antenna 211 and an output of the rectifier circuit 212 do not require operating electric power. The charge circuit 23 can use the DC voltage input from the communication unit 21 as an operating voltage to perform operation. For example, the charge circuit 23 comprises a smoothing capacitor (not shown) that smoothes a DC voltage from the communication unit 21, and can operate based on the DC voltage stored in the smoothing capacitor. Thus, even when the electric power reception apparatus 20 is in a dead battery state, the charge circuit 23 can charge the battery 24, on the condition that the radio wave EW1 for electric power supply is output from the electric power transmission apparatus 10 to the electric power reception apparatus 20.

The electric power reception apparatus 20 also comprises components (e.g., various components such as a display, a speaker, and a camera) (not shown) other than the components described above, and the controller 22 can control these components. It can also be said that the controller 22 is a control circuit. The controller 22 comprises at least one processor for providing control and processing capability to perform various functions as described in further detail below.

In accordance with various embodiments, the at least one processor may be implemented as a single integrated circuit (IC) or as multiple communicatively coupled IC's and/or discrete circuits. It is appreciated that the at least one processor can be implemented in accordance with various known technologies.

In one embodiment, the processor comprises one or more circuits or units configurable to perform one or more data computing procedures or processes by executing instructions stored in an associated memory, for example. In other embodiments, the processor may be implemented as firmware (e.g., discrete logic components) configured to perform one or more data computing procedures or processes.

In accordance with various embodiments, the processor may comprise one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

Note that all of the functions of the controller 22 or a part of the functions of the controller 22 may be implemented by a hardware circuit that does not require software to implement its function.

When the electric power reception apparatus 20 enters an area in which communication with the electric power transmission apparatus 10 using the radio wave EW2 for communication is possible, the controller 22 performs connection processing of establishing wireless connection with the electric power transmission apparatus 10. Such connection processing is performed in accordance with a communication standard. Through the establishment of wireless connection, the electric power transmission apparatus 10 and the electric power reception apparatus 20 can substantially perform communication by using the radio wave EW2.

The controller 22 can output an electric power transmission request signal to the communication unit 21. The electric power transmission request signal is a signal for requesting an output of the radio wave EW1 for electric power supply. The communication unit 21 can transmit a radio wave EW2 for communication superimposed by the electric power transmission request signal from the antenna 211 to the electric power transmission apparatus 10. In this manner, the electric power reception apparatus 20 can request the electric power transmission apparatus 10 to perform electric power transmission. Note that, as described above, the electric power reception apparatus 20 may comprise an antenna that can be used for both of the radio wave EW1 and the radio wave EW2. In other words, frequency (or a frequency band) of the radio wave EW1 and the radio wave EW2 may be the same. Specifically, the communication unit 21 may transmit a radio wave EW2 for communication superimposed by an electric power transmission request signal to the electric power transmission apparatus 10, and the radio wave EW2 may be used by the electric power transmission apparatus 10 to estimate the position of the electric power reception apparatus 20.

The controller 22 may determine charge necessity of the battery 24. If the controller 22 determines that charging of the battery 24 is necessary, the controller 22 may output an electric power transmission request signal to the communication unit 21. For example, the determination of charge necessity of the battery 24 may be performed based on the remaining amount of the battery 24. The remaining amount of the battery 24 can be estimated based on an electric current flowing into the battery 24 and an electric current flowing out of the battery 24. In view of this, the electric power reception apparatus 20 may comprise an electric current sensor (not shown) that detects these electric currents. The electric current sensor outputs an electric signal indicating a detected electric current value to the controller 22. The remaining amount of the battery 24 increases according to time integration of an electric current flowing into the battery 24, and reduces according to time integration of an electric current flowing out of the battery 24. Therefore, the controller 22 can estimate the remaining amount of the battery 24, based on time integration of these electric currents. If the remaining amount of the battery 24 is less than a threshold value, the controller 22 determines that charging of the battery 24 is necessary, and outputs an electric power transmission request signal to the communication unit 21.

The input unit 25 can receive an input from the user, and can output an electric signal indicating details of the input to the controller 22. For example, the input unit 25 may be mounted with the use of any input technology or input device, which is known for technology such as a QWERTY keyboard, a pointing device (e.g., a mouse), a joystick, a stylus, a touch screen display panel, a keyboard, one or more buttons, or a combination of these technologies.

Next, the electric power transmission apparatus 10 will be described. As illustrated in FIG. 2, the electric power transmission apparatus 10 comprises a communication unit 11, a controller 12, a storage medium 13, a notification unit 14, and an input unit 15.

The communication unit (communication circuit) 11 comprises an antenna 111. The antenna 111 can transmit and receive radio waves to and from the electric power reception apparatus 20. The antenna 111 may comprise an array antenna comprising a plurality of antenna elements. The communication unit 11 can output the radio wave EW1 for electric power supply to the surroundings via the antenna 111.

The communication unit 11 can control directivity of the radio wave EW1 for electric power supply. Such technology of controlling directivity of a radio wave is what is called beamforming. The technology of beamforming is as follows. Specifically, amplitude and phase of radio waves EW1 output from a plurality of antenna elements are adjusted per antenna element, and the radio waves EW1 output from each antenna element are caused to interfere with each other. Consequently, intensity (electric power) of the radio wave EW1 in a desired space domain is increased. Each adjustment amount of amplitude and phase corresponding to each antenna element is also referred to as a weight, and a weight group of amplitude and phase for all of the antenna elements is also referred to as a weight vector.

To determine the weight vector, the radio wave EW1 from the electric power reception apparatus 20 can be used. The radio wave EW1 from the electric power reception apparatus 20 is received at each antenna element of the antenna 111, and each antenna element outputs a signal based on the radio wave EW1 to the controller 12. As will be described later, the controller 12 determines a weight vector, based on the signal. The controller 12 outputs a weight signal indicating the determined weight vector to the communication unit 11. The communication unit 11 causes each antenna element of the antenna 111 to output the radio wave EW1 for electric power supply with amplitude and phase based on the weight signal. In this manner, the electric power transmission apparatus 10 can output the radio wave EW1 for electric power supply to the surroundings, with directivity according to a weight signal.

The communication unit 11 can also receive the radio waves EW2 for communication via the antenna 111. The radio waves EW2 for communication are transmitted from the electric power reception apparatus 20. The communication unit 11 can perform various types of processing, such as amplification processing, on a signal that the communication unit 11 receives from the antenna 111. Then, the communication unit 11 can output the processed signal to the controller 12. The controller 12 performs various types of processing on the signal that the controller 12 receives, and recognizes information included in the received signal. The communication unit 11 can perform various types of processing, such as amplification processing, on a signal transmitted from the controller 12 to the communication unit 11. Then, the communication unit 11 can transmit radio waves EW2 for communication superimposed by the processed signal from the antenna 111 to the electric power reception apparatus 20.

The notification unit 14 can perform notification to the user. For example, the notification unit 14 comprises at least any one of a display, a light emitting element, a speaker, and a buzzer. For example, the display is a liquid crystal display or an electro luminescent (EL) display. For example, the light emitting element is a light emitting diode (LED). For example, the speaker is a dynamic speaker. The notification unit 14 performs notification, based on a notification instruction from the controller 12. For example, the display displays details of notification, the light emitting element emits light, the speaker outputs details of notification with voice, or the buzzer outputs notification sound. In this manner, notification can be performed to the user.

The input unit 15 can receive an input from the user, and can output an electric signal indicating details of the input to the controller 12. A hardware configuration of the input unit 15 is the same as a hardware configuration of the input unit 25.

The controller 12 can integrally manage operation of the electric power transmission apparatus 10. It can also be said that the controller 12 is a control circuit. A hardware configuration of the controller 12 is the same as a hardware configuration of the controller 22. Thus, repeated description will be omitted.

When the electric power reception apparatus 20 enters an area in which communication with the electric power transmission apparatus 10 using the radio wave EW2 for communication is possible, the controller 12 performs connection processing of establishing wireless connection with the electric power reception apparatus 20. Such connection processing is performed in accordance with a communication standard.

The controller 12 can receive an electric power transmission request signal from the electric power reception apparatus 20 via the communication unit 11. The controller 12 can recognize that output of the radio wave EW1 for electric power supply is necessary, based on the electric power transmission request signal.

The controller 12 can determine a weight vector. Specifically, the controller 12 determines a weight vector so that the intensity of the radio wave EW1 for electric power supply in a space domain including the position of the electric power reception apparatus 20 is increased. Although any method can be adopted as a method of determining the weight vector, one example of the method will be described briefly. For example, the communication unit 11 of the electric power transmission apparatus 10 receives the radio wave EW1 from the electric power reception apparatus 20 via the array antenna of the antenna 111. Based on the radio wave EW1, the controller 12 of the electric power transmission apparatus 10 estimates the position of the electric power reception apparatus 20, and determines a weight vector. Such position estimation may be understood as estimation of a direction in which the radio wave EW1 arrives from the electric power reception apparatus 20. As such estimation, for example, an estimation method such as a beamformer method, a Capon method, a linear prediction method, and a multiple signal classification (MSIC) method can be adopted.

The controller 12 outputs a weight signal indicating the determined weight vector to the communication unit 11. The communication unit 11 outputs the radio wave EW1 for electric power supply from each antenna element of the antenna 111, with amplitude and phase based on the weight signal input from the controller 12. For example, amplitude of the radio wave EW1 is multiplied by an amplitude weight to determine amplitude of the radio wave EW1 for each antenna element. A phase weight is added to phase of the radio wave EW1 to determine phase of the radio wave EW1 for each antenna element.

In this manner, intensity of the radio wave EW1 in a space domain including the position of the electric power reception apparatus 20 can be increased more than intensity of the radio wave EW1 in another space domain. Specifically, intensity can be reduced in a space domain not requiring the radio wave EW1, and intensity can be increased in a space domain requiring the radio wave EW1. Consequently, the electric power transmission apparatus 10 can efficiently perform electric power transmission to the electric power reception apparatus 20. As described above, the electric power reception apparatus 20 charges the battery 24, based on the radio wave EW1 from the electric power transmission apparatus 10.

The controller 12 can store information about an electric power transmission condition (here, a weight vector) that is used when the radio wave EW1 for electric power supply is output to the electric power reception apparatus 20 in the storage medium 13 as history electric power transmission information. For example, the storage medium 13 is a non-volatile storage medium such as electrically erasable programmable read-only memory (EEPROM). The storage medium 13 may be positioned outside the controller 12, or may be embedded in the controller 12. As the information about an electric power transmission condition, an electric power transmission condition itself can be adopted. "To store an electric power transmission condition in the storage medium 13 as history electric power transmission information" may also be hereinafter expressed as "to register an electric power transmission condition in history electric power transmission information." An electric power transmission condition registered in history electric power transmission information is also referred to as a registered electric power transmission condition. The history electric power transmission information is not limited solely to information storing an electric power transmission condition that was used when the radio wave EW1 for electric power supply was output to the electric power reception apparatus 20. The history electric power transmission information may include an electric power transmission condition having a high probability of being adopted when the radio wave EW1 for electric power supply is output to the electric power reception apparatus 20. The electric power transmission condition having a high probability of being adopted when the radio wave EW1 for electric power supply is output to the electric power reception apparatus 20 can be calculated by machine learning, i.e., calculated by learning performed based on a history of electric power transmission conditions that are used when the radio wave EW1 for electric power supply is output to the electric power reception apparatus 20.

The controller 12 includes a function of counting time. The controller 12 can store a charge time span in which the radio wave EW1 for electric power supply is output to the electric power reception apparatus 20 in the storage medium 13 as history schedule information. The charge time span may include at least any one of a year, a month, a day, and a day of the week, as well as start time and end time. Time can be counted by using a timer circuit or the like. A charge time span registered in history schedule information is hereinafter also referred to as a registered time span. The history schedule information is not limited solely to information storing a charge time span in which the radio wave EW1 for electric power supply was output to the electric power reception apparatus 20. The history schedule information may include a time span in which there is a high probability that the electric power reception apparatus 20 is charged. The time span in which there is a high probability that the electric power reception apparatus 20 is charged can be calculated by machine learning, i.e., calculated by learning performed based on a history of charge time spans in which the radio wave EW1 for electric power supply was output to the electric power reception apparatus 20.

Figure 3:
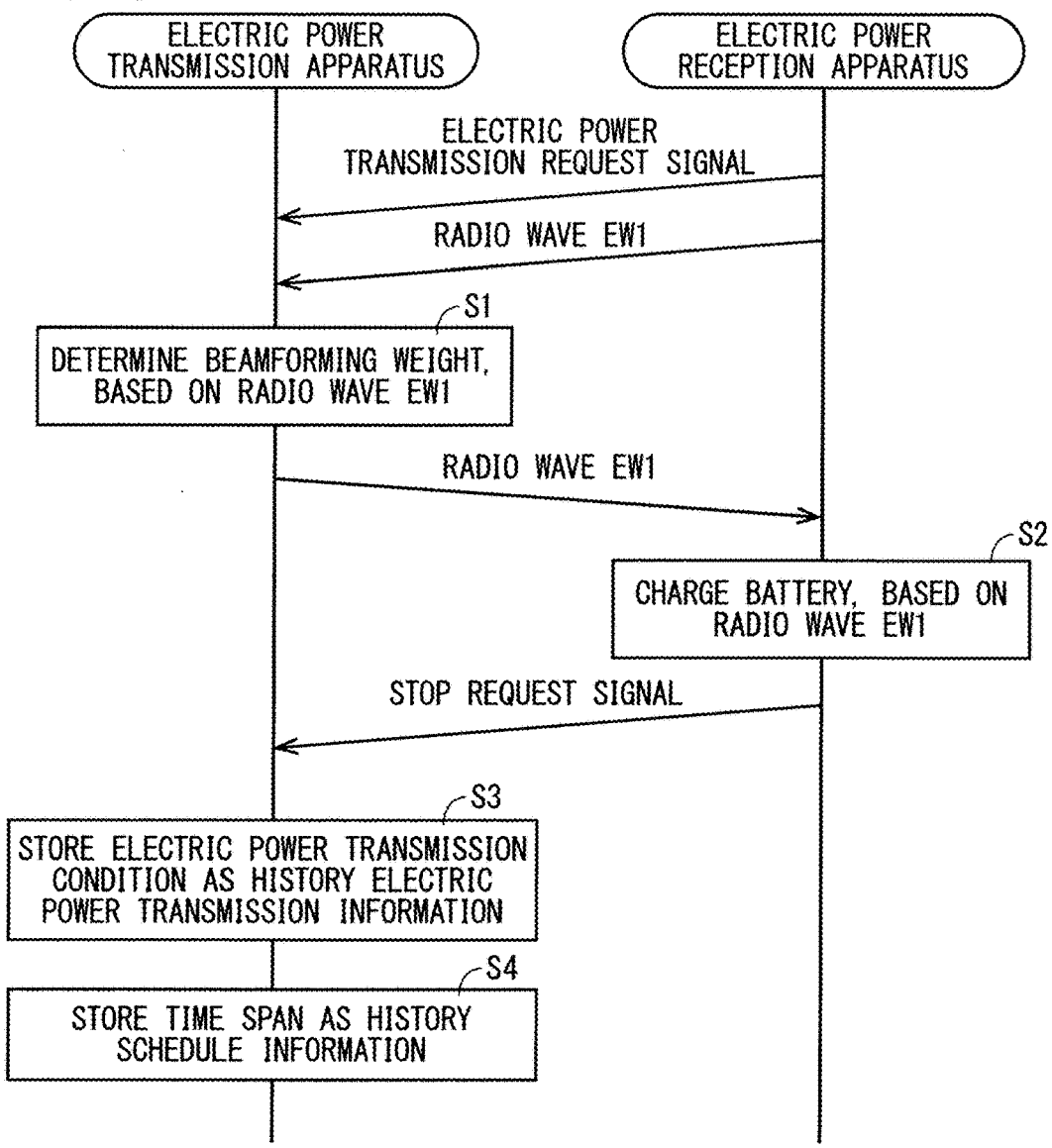
FIG. 3 illustrates a diagram illustrating one example of operation of the wireless electric power supply system.

FIG. 3 illustrates a diagram schematically illustrating one example of the above operation of the wireless electric power supply system 100. Here, the electric power reception apparatus 20 is placed in a room, and wireless connection between the electric power transmission apparatus 10 and the electric power reception apparatus 20 using the radio wave EW2 for communication is established. The remaining amount of the battery 24 is less than a threshold value.

The controller 22 of the electric power reception apparatus 20 determines that charging of the battery 24 is necessary, and outputs an electric power transmission request signal to the communication unit 21. The communication unit 21 transmits a radio wave EW2 for communication superimposed by the electric power transmission request signal to the electric power transmission apparatus 10. The controller 12 of the electric power transmission apparatus 10 receives the electric power transmission request signal via the communication unit 21. In this manner, the controller 12 can recognize that output of the radio wave EW1 for electric power supply to the electric power reception apparatus 20 is necessary.

Next, the controller 22 of the electric power reception apparatus 20 gives an instruction to output the radio wave EW1 to the communication unit 21. The communication unit 21 outputs the radio wave EW1 to the surroundings, based on the instruction. The controller 12 determines a weight vector, based on the radio wave EW1 from the electric power reception apparatus 20 (Step S1). For example, in one example of FIG. 1, the electric power reception apparatus 20 is placed on the placement member TB1. Accordingly, the controller 12 determines a weight vector so that intensity of the radio wave EW1 in a space domain including the electric power reception apparatus 20 on the placement member TB1 is increased more than intensity in another space domain.

The controller 12 outputs a weight signal indicating the determined weight vector to the communication unit 11. The communication unit 11 causes the radio wave EW1 for electric power supply to be output from the antenna 111, with directivity according to the determined weight vector. In this manner, the electric power reception apparatus 20 can receive the radio wave EW1 for electric power supply with higher intensity (hereinafter referred to as reception intensity), and can more efficiently receive electric power.

The charge circuit 23 of the electric power reception apparatus 20 charges the battery 24, based on the radio wave EW1 for electric power supply from the electric power transmission apparatus 10 (Step S2). When charging of the battery 24 ends, the controller 22 of the electric power reception apparatus 20 outputs a stop request signal to the communication unit 21. The communication unit 21 transmits a radio wave EW2 for communication superimposed by the stop request signal from the antenna 211 to the electric power transmission apparatus 10. The controller 12 of the electric power transmission apparatus 10 that has received the stop request signal gives an instruction to stop output of the radio wave EW1 for electric power supply to the communication unit 11.

Next, the controller 12 of the electric power transmission apparatus 10 stores an electric power transmission condition (here, a weight vector) of the radio wave EW1 for electric power supply in the storage medium 13 as history electric power transmission information (Step S3). Since the weight vector indicates the position of the electric power reception apparatus 20, it can also be said that registration of a weight vector in history electric power transmission information is registration of the position of the electric power reception apparatus 20. The controller 12 stores a charge time span in which the radio wave EW1 for electric power supply was output in response to the electric power transmission request signal in the storage medium 13 as history schedule information (Step S4).

Note that, in the above operation example, the electric power reception apparatus 20 voluntarily transmits an electric power transmission request signal, but the configuration is not necessarily limited to this configuration. The electric power transmission apparatus 10 may transmit a response request signal to the electric power reception apparatus 20 by using the radio wave EW2 for communication. The response request signal is a signal for inquiring necessity of electric power transmission. The electric power reception apparatus 20 may transmit an electric power transmission request signal to the electric power transmission apparatus 10 by using the radio wave EW2 for communication, in response to the response request signal.

As described above, the electric power transmission apparatus 10 responds to an electric power transmission request signal from the electric power reception apparatus 20, and outputs the radio wave EW1 for electric power supply to the surroundings, according to the position of the electric power reception apparatus 20. Specifically, even when the user places the electric power reception apparatus 20 at any position in a room, the electric power transmission apparatus 10 outputs the radio wave EW1 with high intensity in a space domain including the position of the electric power transmission apparatus 10. For example, when the user places the electric power reception apparatus 20 on the placement member TB2 (see FIG. 1), the electric power transmission apparatus 10 outputs the radio wave EW1 for electric power supply with high intensity in a space domain including the electric power reception apparatus 20 on the placement member TB2. Consequently, the electric power reception apparatus 20 can receive the radio wave EW1 for electric power supply with high reception intensity. Specifically, no matter at which position the user places the electric power reception apparatus 20, the electric power transmission apparatus 10 can transmit electric power to the electric power reception apparatus 20 with high efficiency, and can charge the battery 24 with high efficiency.

However, in a dead battery state in which the remaining amount of the battery 24 is less than a minimum value necessary for operation of the controller 22 of the electric power reception apparatus 20, the electric power reception apparatus 20 cannot transmit the radio wave EW2 to the electric power transmission apparatus 10. Therefore, the electric power transmission apparatus 10 cannot neither recognize the existence of the electric power reception apparatus 20 nor recognize that electric power transmission is necessary. In a dead battery state, the electric power reception apparatus 20 cannot output the radio wave EW1 to the surroundings either. Therefore, the electric power transmission apparatus 10 cannot estimate the position of the electric power reception apparatus 20 either.

In view of this, in one embodiment, the electric power transmission apparatus 10 also performs the following operation while performing the operation described with reference to FIG. 3. Specifically, the electric power transmission apparatus 10 outputs the radio wave EW1 for electric power supply from the antenna 111 with an electric power transmission condition (here, a weight vector) based on history electric power transmission information, irrespective of whether or not the electric power transmission apparatus 10 has received an electric power transmission request signal from the electric power reception apparatus 20. Specifically, the electric power transmission apparatus 10 outputs the radio wave EW1 for electric power supply toward a placement position of the electric power reception apparatus 20 in previous charging, irrespective of presence or absence of reception of an electric power transmission request signal. Note that the placement position is a position indicated by a weight vector registered in the history electric power transmission information, and is thus hereinafter also referred to as a registered position.

The electric power transmission apparatus 10 outputs the radio wave EW1 for electric power supply to the registered position even when the electric power transmission apparatus 10 does not receive an electric power transmission request signal. Therefore, even when the electric power reception apparatus 20 is in a dead battery state, the electric power reception apparatus 20 can receive the radio wave EW1 with high reception intensity when the user places the electric power reception apparatus 20 at the registered position. As described above, even when the electric power reception apparatus 20 is in a dead battery state, the charge circuit 23 can charge the battery 24 based on a DC voltage from the communication unit 21, when the electric power reception apparatus 20 receives the radio wave EW1.

As described above, according to the electric power transmission apparatus 10 of one embodiment, even when the electric power reception apparatus 20 falls in a state in which the controller 22 cannot be activated due to insufficient electric power, such as in a dead battery state, the battery 24 can be charged when the user places the electric power reception apparatus 20 at a registered position. According to the electric power transmission apparatus 10 of one embodiment, even when the electric power reception apparatus 20 falls in a state in which the controller 22 cannot be activated due to insufficient electric power, such as in a dead battery state, the electric power reception apparatus 20 can be supplied with electric power necessary for operation by using a radio wave.

Note that, if the electric power transmission apparatus 10 always outputs the radio wave EW1 for electric power supply toward a registered position, power consumption of the electric power transmission apparatus 10 increases. In view of this, only in a time span based on a previous charge time span, the electric power transmission apparatus 10 may output the radio wave EW1 for electric power supply, irrespective of presence or absence of reception of an electric power transmission request signal. In this manner, in a time span in which there is a high probability that the user is to charge the battery 24 of the electric power reception apparatus 20, charging of the battery 24 in a dead battery state is enabled. In contrast, in a time span in which there is a low probability that the user is to charge the battery 24, output of the radio wave EW1 not using an electric power transmission request signal as a trigger is restricted. Consequently, power consumption of the electric power transmission apparatus 10 can be reduced.

Figure 4:
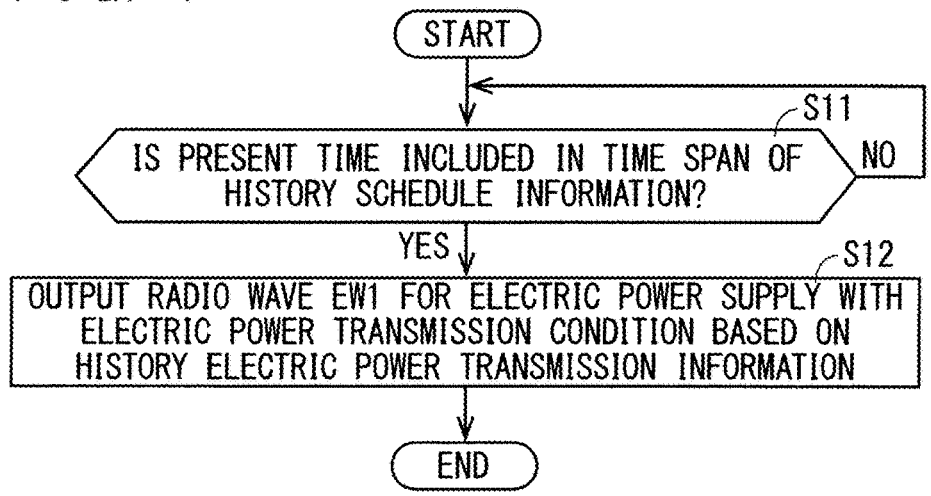
FIG. 4 illustrates a flowchart illustrating one example of operation of an electric power transmission apparatus.

FIG. 4 illustrates a flowchart illustrating one example of the above operation of the electric power transmission apparatus 10. First, the controller 12 of the electric power transmission apparatus 10 determines whether or not the present time is included in a registered time span of the history schedule information stored in the storage medium 13 (Step S11). If the present time is not included in a registered time span, the controller 12 executes Step S11 again.

If the present time is included in a registered time span, the electric power transmission apparatus 10 outputs the radio wave EW1 for electric power supply from the antenna 111 with an electric power transmission condition based on the history electric power transmission information, irrespective of presence or absence of reception of an electric power transmission request signal (Step S12). Specifically, the controller 12 of the electric power transmission apparatus 10 outputs a weight signal indicating a weight vector of the history electric power transmission information to the communication unit 11. The communication unit 11 causes each antenna element of the antenna 111 to output the radio wave EW1 for electric power supply with amplitude and phase based on of the weight signal.

In this manner, the electric power transmission apparatus 10 can output the radio wave EW1 for electric power supply with relatively high intensity in a space domain including the registered position. In this manner, even when the electric power reception apparatus 20 is in a dead battery state, the electric power reception apparatus 20 can receive the radio wave EW1 for electric power supply from the electric power transmission apparatus 10 and can charge the battery 24, when the user places the electric power reception apparatus 20 at the registered position in the registered time span.

Next, how the electric power transmission apparatus 10 adjusts amplitude (or transmission intensity (electric power), the same holds hereinafter) of the radio wave EW1 for electric power supply will be described. For example, the amplitude used herein refers to amplitude before being multiplied by a beamforming weight (hereinafter referred to as pre-adjustment amplitude).

Intensity of the radio wave EW1 for electric power supply output from the electric power transmission apparatus 10 is reduced depending on a state of a propagation path in a space, and is received by the electric power reception apparatus 20. Thus, reception intensity of the electric power reception apparatus 20 depends on a state of a propagation path. To give brief description, reception intensity is lower as a distance between the electric power transmission apparatus 10 and the electric power reception apparatus 20 is longer, and reception intensity is also lower when there is an obstacle between the electric power transmission apparatus 10 and the electric power reception apparatus 20.

Lower reception intensity implies that less electric power is received by the electric power reception apparatus 20. Therefore, charge time of the battery 24 may be longer. In contrast, higher reception intensity may cause unnecessary power consumption that does not contribute to charging of the battery 24.

In view of this, the electric power transmission apparatus 10 and the electric power reception apparatus 20 transmit and receive the radio wave EW2 for communication with each other to adjust pre-adjustment amplitude of the radio wave EW1 of the electric power transmission apparatus 10 so that reception intensity of the radio wave EW1 for electric power supply falls within a predetermined range suitable for charging.

As one specific example, the electric power reception apparatus 20 transmits an increase request signal or a reduction request signal to the electric power transmission apparatus 10 by using the radio wave EW2 for communication, so that reception intensity falls within a predetermined range. The increase request signal is a signal for requesting increase in amplitude. The reduction request signal is a signal for requesting reduction in amplitude.

For example, in Step S2 of FIG. 3, the charge circuit 23 determines whether or not reception intensity is within a predetermined range. As one more specific example, the charge circuit 23 may determine whether or not a DC voltage from the communication unit 21 according to reception intensity of the radio wave EW1 is within a range suitable for charging, and may output an electric signal indicating a result of the determination to the controller 22. If the reception intensity is less than a minimum value of the predetermined range, the controller 22 transmits an increase request signal to the electric power transmission apparatus 10 by using the radio wave EW2 via the communication unit 21. On the other hand, if the reception intensity is higher than a maximum value of the predetermined range, the controller 22 transmits a reduction request signal to the electric power transmission apparatus 10 by using the radio wave EW2 via the communication unit 21.

When the electric power transmission apparatus 10 receives the increase request signal, the electric power transmission apparatus 10 increases the pre-adjustment amplitude to output the radio wave EW1 for electric power supply. When the electric power transmission apparatus 10 receives the reduction request signal, the electric power transmission apparatus 10 reduces the pre-adjustment amplitude to output the radio wave EW1 for electric power supply. In this manner, the electric power transmission apparatus 10 can output the radio wave EW1 for electric power supply with transmission intensity according to a request from the electric power reception apparatus 20. Consequently, the electric power reception apparatus 20 can receive the radio wave EW1 with reception intensity suitable for charging.

The pre-adjustment amplitude of the radio wave EW1 for electric power supply determined as described above is suitable for charging of the electric power reception apparatus 20. Therefore, such pre-adjustment amplitude may also be applied to the radio wave EW1 (FIG. 4) that is output irrespective of presence or absence of reception of an electric power transmission request signal, not only to the radio wave EW1 (FIG. 3) that is output in response to an electric power transmission request signal.

In view of this, in Step S3 of FIG. 3, the controller 12 of the electric power transmission apparatus 10 stores the pre-adjustment amplitude of the radio wave EW1 for electric power supply adopted in Step S2 in the storage medium 13 as history electric power transmission information. Specifically, the pre-adjustment amplitude is registered in history electric power transmission information.

Then, in Step S12 of FIG. 4, the electric power transmission apparatus 10 outputs the radio wave EW1 for electric power supply from each antenna element of the antenna 111 to the surroundings, with amplitude and phase based on the pre-adjustment amplitude and the weight vector of the history electric power transmission information.

According to this configuration, even when the electric power reception apparatus 20 is in a dead battery state, the electric power reception apparatus 20 can receive the radio wave EW1 with reception intensity suitable for charging. Therefore, the electric power reception apparatus 20 can charge the battery 24, based on the radio wave EW1 suitable for charging.

Note that reception intensity the most suitable for charging may vary during the charging of Step S2. For example, the most suitable reception intensity may vary depending on the remaining amount of the battery 24, ambient temperature, etc. In view of this, the electric power reception apparatus 20 may appropriately transmit a reduction request signal or an increase request signal to the electric power transmission apparatus 10 by using the radio wave EW2 during the charging of Step S2 (FIG. 3), so that the electric power reception apparatus 20 can receive the radio wave EW1 for electric power supply with more suitable reception intensity. The electric power transmission apparatus 10 changes the pre-adjustment amplitude of the radio wave EW1 for electric power supply, according to the reduction request signal and the increase request signal from the electric power reception apparatus 20.

When the pre-adjustment amplitude of the radio wave EW1 is changed during charging as described above, a plurality of pre-adjustment amplitudes of the radio waves EW1 adopted in the charging may be registered in the history electric power transmission information in Step S3. Alternatively, pre-adjustment amplitude of the radio wave EW1 that is adopted in the charging for the longest period of time may be registered in the history electric power transmission information. Alternatively, an average value, a maximum value, a minimum value, or the like of pre-adjustment amplitudes of the radio waves EW1 may be registered in the history electric power transmission information. The most suitable pre-adjustment amplitude according to an elapsed period of time of charging may be calculated by using machine learning as described above, and the calculated most suitable pre-adjustment amplitude may be registered in the history electric power transmission information.

Note that more secure charging is desired in a dead battery state. This is because of the following reason. Specifically, the electric power reception apparatus 20 in a dead battery state cannot transmit the radio wave EW2 for communication to the electric power transmission apparatus 10, and therefore when charging of the battery 24 fails, the electric power transmission apparatus 10 has difficulty in recognizing the failure.

In view of this, when the pre-adjustment amplitude is dynamically changed during charging, the controller 12 of the electric power transmission apparatus 10 may register a minimum value of the pre-adjustment amplitudes of the radio waves EW1 for electric power supply adopted during the charging of Step S2 in the history electric power transmission information in Step S3. According to this configuration, in Step S12, the electric power transmission apparatus 10 outputs, from the antenna 111, the radio wave EW1 based on the minimum pre-adjustment amplitude in the history electric power transmission information. Therefore, even in a dead battery state, the electric power reception apparatus 20 can charge the battery 24 more securely.

In one example described above, a weight vector and pre-adjustment amplitude of the radio wave EW1 are adopted as the electric power transmission condition registered in the history electric power transmission information. However, frequency of the radio wave EW1 may be adopted as the electric power transmission condition. This is because reception intensity of the radio wave EW1 for electric power supply in the electric power reception apparatus 20 may also depend on frequency of the radio wave EW1.

Figure 5:
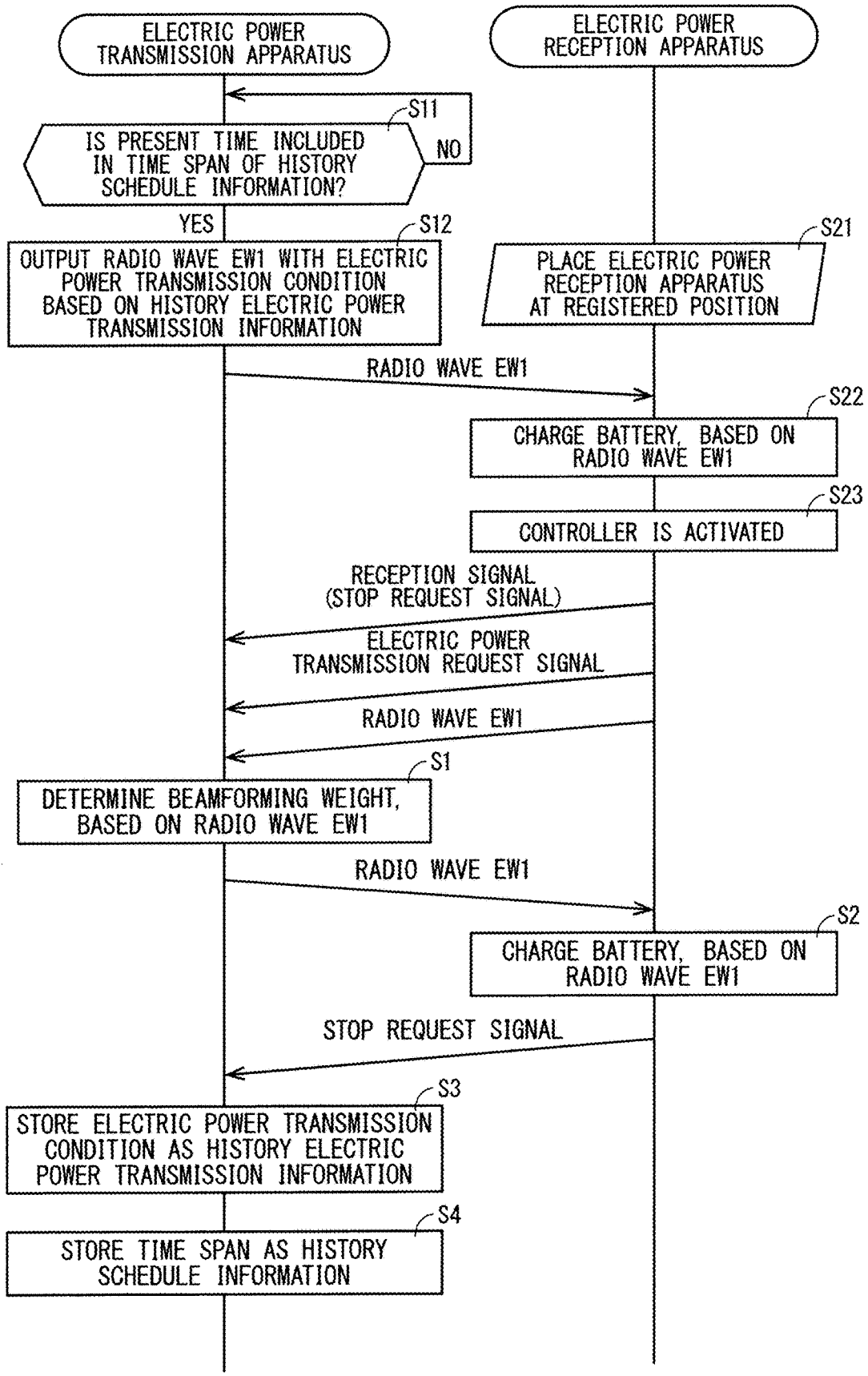
FIG. 5 illustrates a diagram illustrating one example of operation of the wireless electric power supply system.

FIG. 5 illustrates a diagram illustrating another example of operation of the wireless electric power supply system 100. Here, one example of the operation when the radio wave EW1 is output irrespective of presence or absence of reception of an electric power transmission request signal will be described.

As illustrated in FIG. 5, the controller 12 of the electric power transmission apparatus 10 executes Step S11 and Step S12 to output the radio wave EW1 for electric power supply with an electric power transmission condition based on the history electric power transmission information, irrespective of presence or absence of reception of an electric power transmission request signal. In this manner, the radio wave EW1 for electric power supply is output toward the registered position.

Meanwhile, the user places the electric power reception apparatus 20 at the registered position (Step S21). In this manner, the electric power reception apparatus 20 receives the radio wave EW1 for electric power supply from the electric power transmission apparatus 10. Then, the electric power reception apparatus 20 charges the battery 24, based on the radio wave EW1 (Step S22).

Since the battery 24 is charged, the dead battery state will be eventually solved. Specifically, the remaining amount of the battery 24 will eventually exceed a minimum value necessary for activation of the controller 22 of the electric power reception apparatus 20. When the user inputs an activation instruction to the input unit 25 of the electric power reception apparatus 20 in this state, the input unit 25 outputs input information of the input to the controller 22, and the controller 22 is activated according to the input information (Step S23).

Incidentally, the electric power transmission condition of the radio wave EW1 for electric power supply in Step S12 is only an electric power transmission condition used in previous charging, and is not an electric power transmission condition according to a state of a propagation path at the time point in Step S12. For example, in a strict sense, the placement position of the electric power reception apparatus 20 in Step S21 may be different from the registered position. Therefore, when the controller 22 is activated, radio waves may be transmitted and received between the electric power transmission apparatus 10 and the electric power reception apparatus 20, and then an electric power transmission condition according to a propagation path at that time point may be newly determined.

In view of this, when the controller 22 is activated, first, connection processing of establishing wireless connection between the electric power transmission apparatus 10 and the electric power reception apparatus 20 by using the radio wave EW2 is performed. Then, the electric power reception apparatus 20 determines whether or not the radio wave EW1 is received at the time of activation of the controller 22. For example, the charge circuit 23 may notify the controller 22 of presence or absence of reception of the radio wave EW1. When the radio wave EW1 is received, the electric power reception apparatus 20 transmits a reception signal to the electric power transmission apparatus 10 by using the radio wave EW2 for communication. The reception signal indicates that the radio wave EW1 is received. The electric power transmission apparatus 10 stops output of the radio wave EW1, according to the reception signal. Specifically, the electric power transmission apparatus 10 stops output of the radio wave EW1 for electric power supply with the electric power transmission condition based on the history electric power transmission information. The reception signal functions as an electric power transmission stop signal for stopping output of the radio wave EW1.

Next, the electric power reception apparatus 20 transmits an electric power transmission request signal to the electric power transmission apparatus 10 by using the radio wave EW2, and performs operation the same as the operation of FIG. 3. In this manner, the electric power transmission apparatus 10 can output the radio wave EW1 for electric power supply with an electric power transmission condition according to a state of a propagation path. Therefore, the radio wave EW1 for electric power supply can be output to the electric power reception apparatus 20, with more highly accurate directivity and with transmission intensity more suitable for charging. Note that Step S3 and Step S4 are not necessarily required in this case (i.e., in FIG. 5).

Next, notification performed by the notification unit 14 will be described. It is possible that the user does not notice that the electric power reception apparatus 20 is in a dead battery state. Therefore, here, the notification unit 14 performs notification of a detail about a state of the electric power reception apparatus 20.

Figure 6:
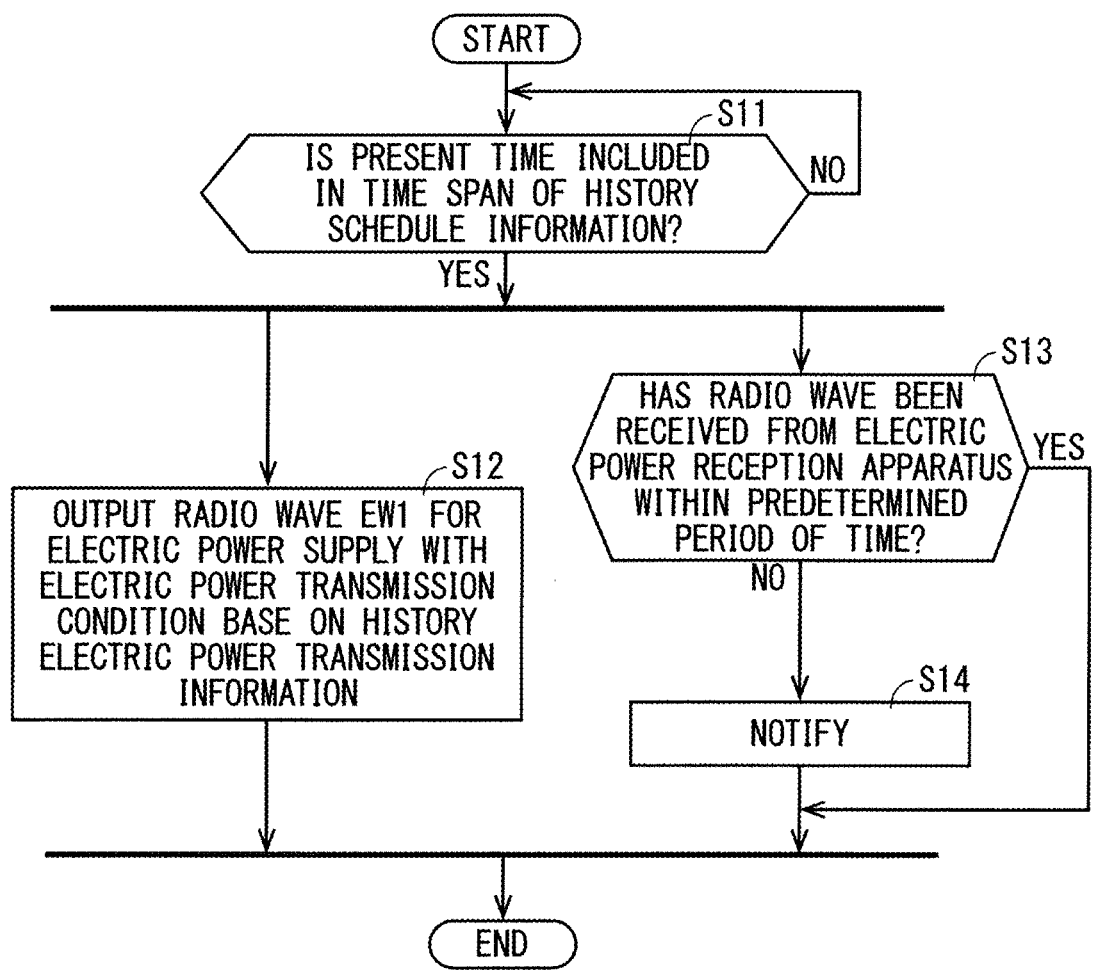
FIG. 6 illustrates a flowchart illustrating one example of operation of the electric power transmission apparatus.

FIG. 6 illustrates a flowchart illustrating one example of operation of the controller 12 of the electric power transmission apparatus 10. In one example of FIG. 6, the controller 12 executes a set of Step S13 and Step S14, in parallel with Step S12. In Step S13, the controller 12 determines whether or not the radio wave EW2 for communication has been received from the electric power reception apparatus 20 via the communication unit 11 within a predetermined period of time. A signal included in the radio wave EW2 may be any signal. Examples of the signal may include a beacon signal, an electric power transmission request signal, a reception signal, and a stop request signal. The beacon signal is a signal used for connection processing performed between the electric power transmission apparatus 10 and the electric power reception apparatus 20, and is a signal for confirming whether or not there is an apparatus capable of communication around the electric power reception apparatus 20. The electric power reception apparatus 20 repeatedly transmits a beacon signal to the surroundings from the antenna 211 by using the radio wave EW2 for communication.

If the controller 12 of the electric power transmission apparatus 10 receives the radio wave EW2 for communication from the electric power reception apparatus 20 via the communication unit 11, the electric power reception apparatus 20 is not in a dead battery state and thus does not execute Step S14.

On the other hand, if the controller 12 does not receive the radio wave EW2 for communication from the electric power reception apparatus 20 via the communication unit 11 for a predetermined period of time, the controller 12 causes the notification unit 14 to perform notification of a first detail about a state (e.g., a battery state) of the electric power reception apparatus 20 (Step S14). For example, the first detail includes a detail of prompting the user to confirm whether or not the electric power reception apparatus 20 is in a dead battery state. Specifically, when the electric power transmission apparatus 10 does not receive the radio wave EW2 from the electric power reception apparatus 20 for a predetermined period of time in a registered time span in which charging has been previously performed, the electric power reception apparatus 20 may be in a dead battery state. Therefore, the controller 12 causes the notification unit 14 to perform notification that the electric power reception apparatus 20 may be in a dead battery state. The notification is performed through display on a display, light emission of a light emitting element, a voice output of a speaker, and an output of notification sound of a buzzer, for example.

If the notification unit 14 of the electric power transmission apparatus 10 performs the notification when the user brings the electric power reception apparatus 20 into a room in the registered time span, the user can recognize that the electric power reception apparatus 20 may be in a dead battery state, based on the notification. The user can check the electric power reception apparatus 20 to confirm that the electric power reception apparatus 20 is in a dead battery state. Subsequently, the user will place the electric power reception apparatus 20 at the registered position with the intention of charging the battery 24 of the electric power reception apparatus 20.

After the user places the electric power reception apparatus 20 at the registered position, the electric power reception apparatus 20 receives the radio wave EW1 for electric power supply output from the electric power transmission apparatus 10 (Step 12). Then, the electric power reception apparatus 20 charges the battery 24, based on the radio wave EW1. In this manner, even in a dead battery state, the battery 24 can be charged.

As described above, through the notification of the notification unit 14, the user can promptly recognize that the electric power reception apparatus 20 is in a dead battery state, and can promptly cope with the dead battery state.

Figure 7:
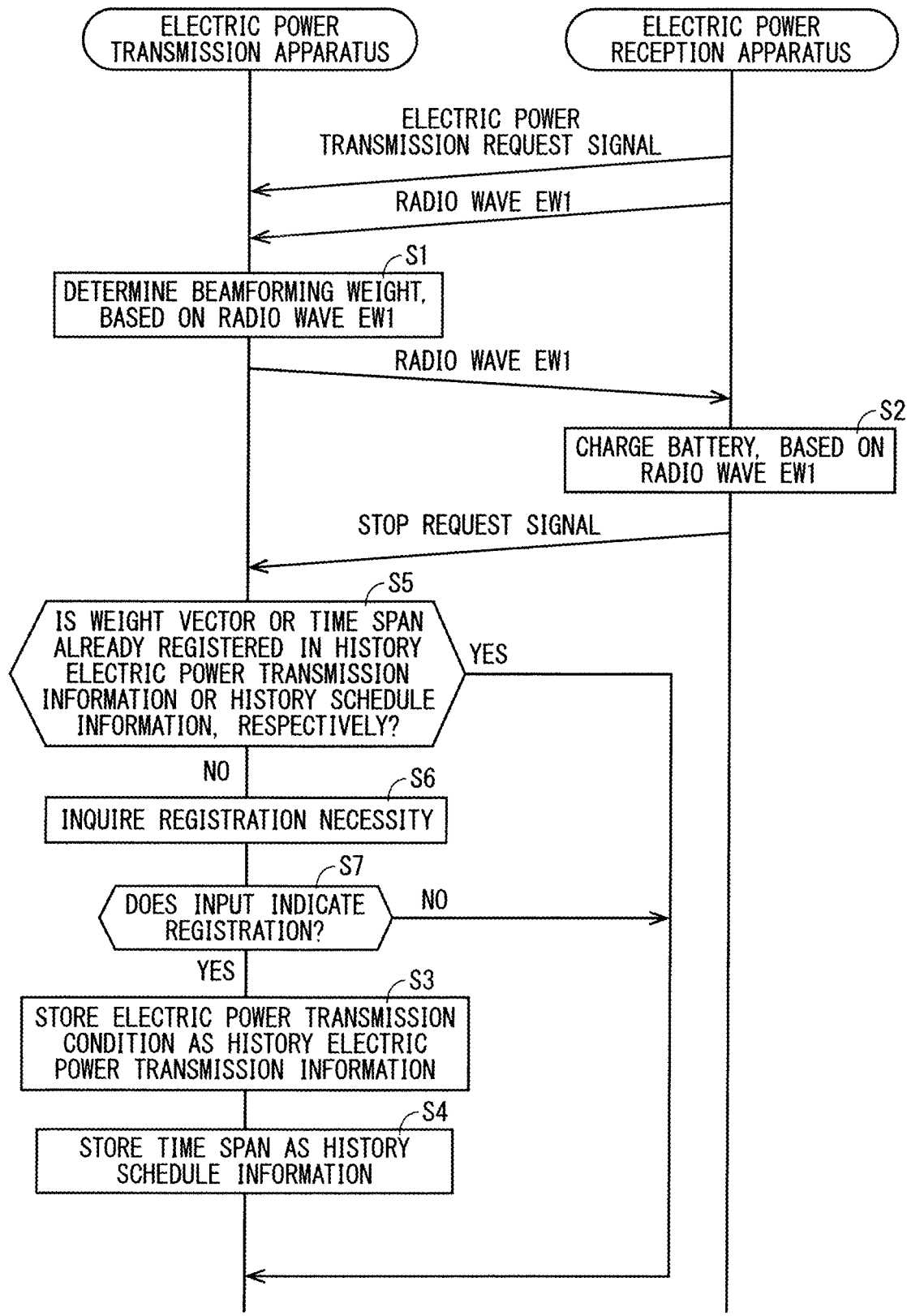
FIG. 7 illustrates a diagram illustrating one example of operation of the wireless electric power supply system.

Next, registration processing when an electric power transmission condition and a charge time span are respectively registered in history electric power transmission information and history schedule information will be described. FIG. 7 illustrates a diagram illustrating another example of operation of the controller 12 of the electric power transmission apparatus 10. Here, the electric power reception apparatus 20 is placed in a room, and wireless connection between the electric power transmission apparatus 10 and the electric power reception apparatus 20 using the radio wave EW2 for communication is established. An electric power transmission condition and a charge time span are respectively registered in history electric power transmission information and history schedule information.

Operation until the electric power reception apparatus 20 transmits a stop request signal to the electric power transmission apparatus 10 by using the radio wave EW2 for communication is the same as the operation of FIG. 3.

If the controller 12 of the electric power transmission apparatus 10 receives the stop request signal via the communication unit 11, the controller 12 of the electric power transmission apparatus 10 determines whether or not the weight vector or the charge time span determined in Step S1 is already registered in the history electric power transmission information or the history schedule information, respectively (Step S5). As one more specific example, the controller 12 determines whether or not a difference between the weight vector determined in Step S1 and the weight vector registered in the history electric power transmission information is equal to or greater than a first reference value. For example, the difference used herein may be a magnitude of a difference vector between both of the weight vectors. If the difference between both of the weight vectors is less than the first reference value, the controller 12 may determine that the weight vector determined in Step S1 is already registered. On the other hand, if the difference between both of the weight vectors is equal to or greater than the first reference value, the controller 12 may determine that the weight vector determined in Step S1 is not registered yet.

For example, if at least any one of a difference between start time of the charge time span and start time of the registered time span and a difference between end time of the charge time span and end time of the registered time span is equal to or greater than a second reference value, the controller 12 may determine that the charge time span is not registered yet. On the other hand, if both of these differences are less than the second reference value, the controller 12 may determine that the charge time span is already registered.

If the weight vector or the charge time span is not registered yet, the controller 12 performs processing of inquiring, of the user, registration necessity of the electric power transmission condition and the charge time span (Step S6). For example, the controller 12 causes a display of the notification unit 14 to display a display detail of inquiring registration necessity. The user gives an instruction in response to the inquiry to the input unit 15.

Next, the controller 12 determines whether or not the input to the input unit 15 indicates registration (Step S7). If the input detail indicates registration, the controller 12 performs Step S3 and Step S4 in the mentioned order. In this manner, the weight vector and the charge time span are newly registered.

If both of the weight vector and the charge time span are already registered, or if the input is not registered yet, the controller 12 does not execute Step S3 and Step S4, and the processing ends.

Note that also when pre-adjustment amplitude and frequency of the radio wave EW2 are adopted as the electric power transmission condition, the controller 12 may perform the same operation.

According to the operation, unnecessary registration of an electric power transmission condition and a charge time span can be avoided. Thus, the user can easily manage the registered position and the registered time span. Note that, when machine learning as described above is used, processing of inquiring registration necessity of the user may be omitted, and the history electric power transmission information and the history schedule information may be calculated based on a part or all of a previous history of the electric power transmission conditions and the charge time spans. Specifically, the registered electric power transmission condition may be calculated by machine learning, based on a plurality of electric power transmission conditions of the radio waves EW2 output in a plurality of previous charge time spans. The registered time span may be calculated by machine learning, based on the plurality of charge time spans. In other words, information about the electric power transmission condition recorded as the history electric power transmission information includes an electric power transmission condition calculated based on a plurality of electric power transmission conditions.

When a weight vector and pre-adjustment amplitude are adopted as the electric power transmission condition, the controller 12 may associate the weight vector and the pre-adjustment amplitude with each other to register the associated weight vector and pre-adjustment amplitude. In the operation when the radio wave EW1 is output irrespective of presence or absence of reception of an electric power transmission request signal, the controller 12 may use the electric power transmission condition with associated weight vector and pre-adjustment amplitude. Specifically, in Step S12 of FIG. 3, the controller 12 may adopt weight vector and pre-adjustment amplitude associated with each other. In this manner, the radio wave EW1 for electric power supply can be output with a combination of electric power transmission conditions adopted in previous charging. When frequency is further adopted as the electric power transmission condition, each electric power transmission condition may be associated with each other to be registered. When each electric power transmission condition is registered in the history electric power transmission information by using machine learning, processing using machine learning may also be adopted in association of each electric power transmission condition.

This configuration is effective when the electric power transmission apparatus 10 outputs the radio waves EW1 for electric power supply to each of a plurality of types of electric power reception apparatuses 20. Specifically, the user places the electric power reception apparatuses 20 at registered positions different from each other to charge batteries 24 of the electric power reception apparatuses 20. In this manner, a registered position (weight vector) dedicated to each of the electric power reception apparatuses 20 and pre-adjustment amplitude (and further, frequency) suitable for each of the electric power reception apparatuses 20 can be registered. When the electric power reception apparatuses 20 fall in a dead battery state, the user places the electric power reception apparatuses 20 at respective registered positions of the electric power reception apparatuses 20. In this manner, the electric power transmission apparatus 10 outputs the radio waves EW1 for electric power supply with the pre-adjustment amplitude (and further, frequency) suitable for the electric power reception apparatuses 20. Consequently, the electric power reception apparatuses 20 can receive the radio wave EW1 with reception intensity suitable for the electric power reception apparatuses 20 themselves.

The registered time span and the registered electric power transmission condition need not be associated with each other. For example, if the present time is included in a certain registered time span (YES in Step S11), in Step S12, for example, the controller 12 may cause the antenna 111 to output the radio wave EW1 with a plurality of electric power transmission conditions in a time-division manner (Step S12). Alternatively, the registered time span and the registered electric power transmission condition may be associated with each other. For example, if the present time is included in a certain registered time span (YES in Step S11), in Step S12, the controller 12 may output cause the antenna 111 to the radio wave EW1 with an electric power transmission condition corresponding to the registered time span. When an electric power transmission condition and a time span are respectively registered in the history electric power transmission information and the history schedule information by using machine learning, processing using machine learning may also be adopted in association of the registered time span and the register electric power transmission condition.

Figure 8:
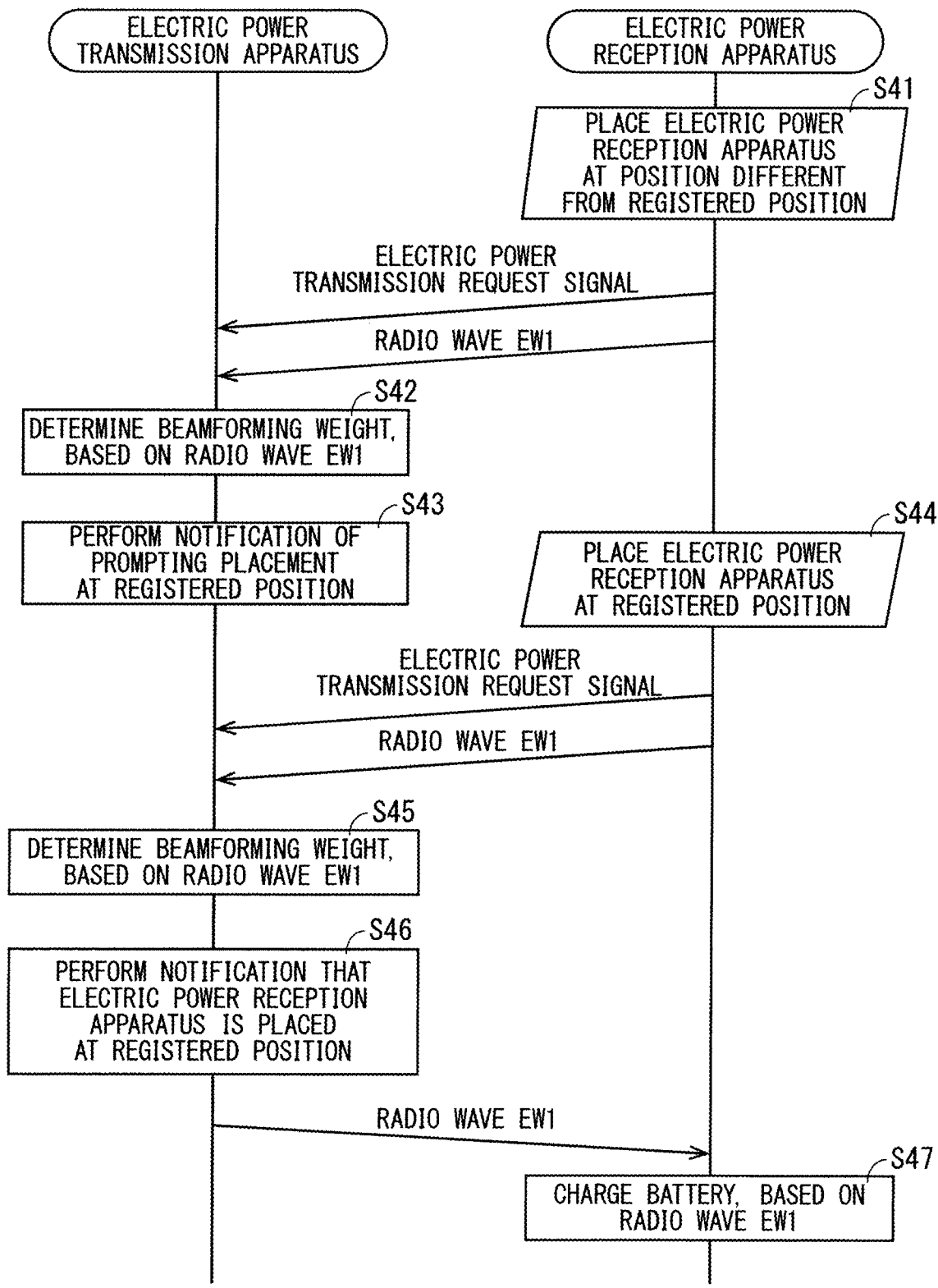
FIG. 8 illustrates a diagram illustrating one example of operation of the wireless electric power supply system.

FIG. 8 illustrates a diagram illustrating another example of operation of the wireless electric power supply system 100. Here, wireless connection between the electric power transmission apparatus 10 and the electric power reception apparatus 20 using the radio wave EW2 for communication is established, and the remaining amount of the battery 24 is less than a threshold value. An electric power transmission condition and a charge time span are respectively registered in history electric power transmission information and history schedule information.

The user places the electric power reception apparatus 20 at a position different from the registered position (Step S41).

The controller 22 of the electric power reception apparatus 20 determines that charging of the battery 24 is necessary, and causes the electric power transmission apparatus 10 to transmit an electric power transmission request signal by using the radio wave EW2. The controller 12 of the electric power transmission apparatus 10 can recognize that output of the radio wave EW1 for electric power supply is necessary, based on the electric power transmission request signal.

Next, the communication unit 21 of the electric power reception apparatus 20 outputs the radio wave EW1 to the surroundings.

The controller 12 of the electric power transmission apparatus 10 determines a weight vector, based on the radio wave EW1 from the electric power reception apparatus 20 (Step S42).

Next, the controller 12 determines whether or not the weight vector determined in Step S42 is different from the weight vector registered in the history electric power transmission information. More specifically, if the difference between both of the weight vectors is equal to or greater than a first reference value, the controller 12 determines that the weight vector determined in Step S1 is different from the weight vector registered in the history electric power transmission information.

Here, because the electric power reception apparatus 20 is placed at a position different from the registered position (Step S41), the controller 12 determines that both of the weight vectors are different from each other. At this time, the controller 12 causes the notification unit 14 to perform notification of a second detail about the position of the electric power reception apparatus 20 (Step S43). For example, the second detail is a detail of prompting the user to place the electric power reception apparatus 20 at the registered position. For example, a message "Place the electric power reception apparatus 20 at the registered position to enable charging in a dead battery state" is displayed on the display of the notification unit 14. Alternatively, the message is output by the speaker of the notification unit 14 with voice. Through the notification, the user moves the electric power reception apparatus 20 to place the electric power reception apparatus 20 at the registered position (Step S44).

If the controller 22 of the electric power reception apparatus 20 does not receive the radio wave EW1 for electric power supply within a predetermined period of time since transmission of an electric power transmission request signal, the controller 22 of the electric power reception apparatus 20 causes the communication unit 21 to transmit an electric power transmission request signal again. Subsequently, the communication unit 21 outputs the radio wave EW1 from the antenna 211 again.

The controller 12 of the electric power transmission apparatus 10 determines a weight vector, based on the radio wave EW1 from the electric power reception apparatus 20 (Step S45). Next, the controller 12 determines whether or not the weight vector determined in Step S45 is different from the weight vector registered in the history electric power transmission information. Here, because the electric power reception apparatus 20 is placed at the registered position (Step S44), the controller 12 determines that both of the weight vectors match with each other. The controller 12 causes the notification unit 14 to notify the user of a third detail about the position of the electric power reception apparatus 20 (Step S46). The third detail is a detail indicating that the electric power reception apparatus 20 has returned to the registered position. For example, a message "The electric power reception apparatus has been placed at the registered position" is displayed on the display of the notification unit 14. Alternatively, the message is output by the speaker of the notification unit 14 with voice.

In short, the controller 12 determines a weight vector again, based on the radio wave EW2 received from the electric power reception apparatus after the controller 12 determines that a weight vector is different from the weight vector in the history electric power transmission information. If the weight vector matches the weight vector in the history electric power transmission information, the controller 12 causes the notification unit 14 to perform notification of a third detail about the position of the electric power reception apparatus 20.

In this manner, the user can recognize that the electric power reception apparatus 20 has been placed at the registered position.

Then, the controller 12 outputs a weight signal to the communication unit 11. The communication unit 11 outputs the radio wave EW1 for electric power supply from the antenna 111, with amplitude and phase according to the weight signal.

The communication unit 21 of the electric power reception apparatus 20 receives the radio wave EW1, and outputs a DC voltage to the charge circuit 23, based on the radio wave EW1. The charge circuit 23 charges the battery 24, based on the DC voltage (Step S46).

According to this configuration, charging is performed while the electric power reception apparatus 20 is placed at the registered position. Therefore, increase in the number of electric power transmission conditions registered in the history electric power transmission information can be reduced. In this manner, the user can easily manage the registered position.

Figure 9:
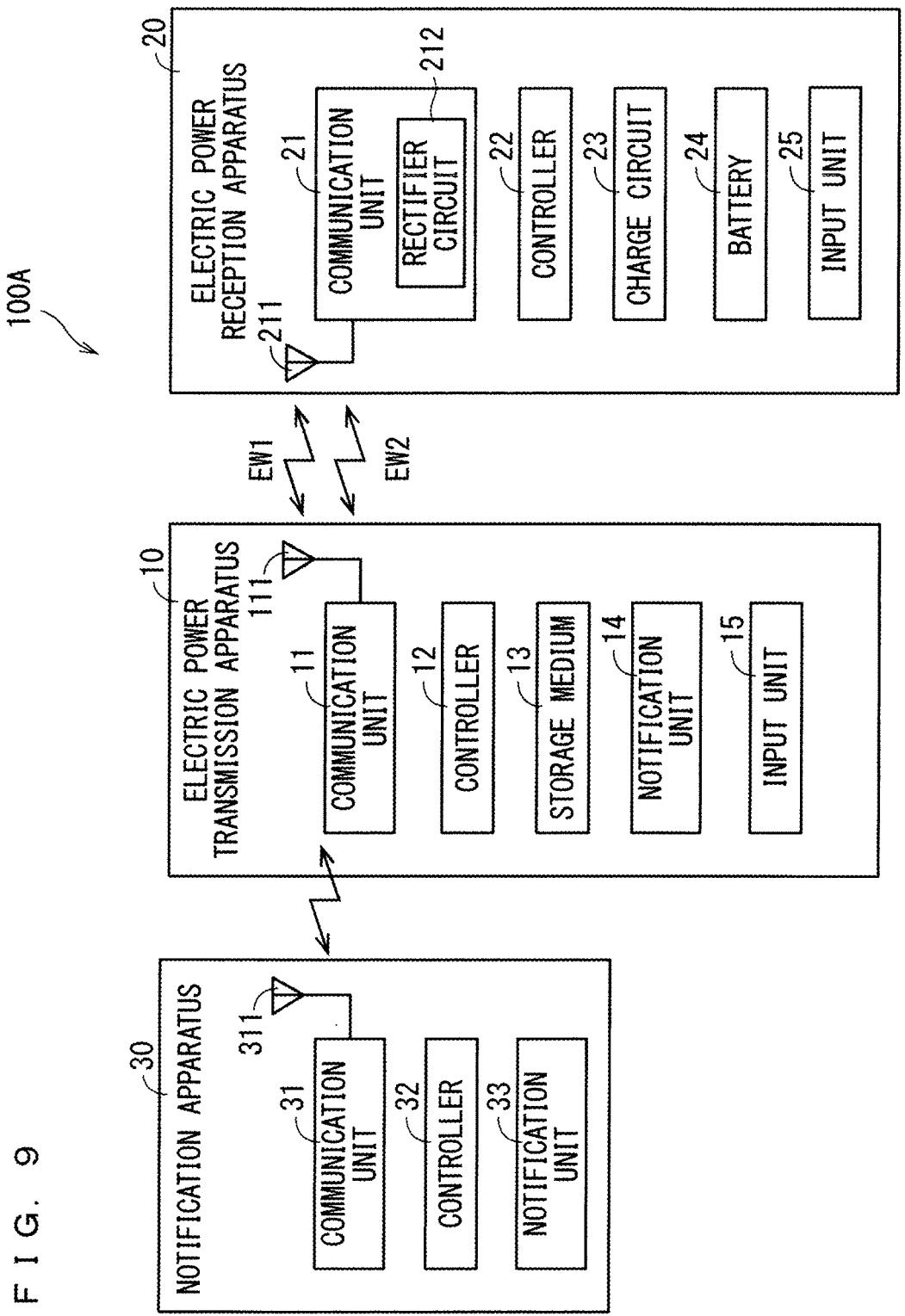
FIG. 9 illustrates a diagram schematically illustrating one example of an electrical configuration of a wireless electric power supply system.

In one example described above, the notification unit 14 is located in the electric power transmission apparatus 10. However, the notification unit 14 may be located separately from the electric power transmission apparatus 10. FIG. 9 illustrates a diagram schematically illustrating one example of an electrical configuration of a wireless electric power supply system 100A.

The wireless electric power supply system 100A includes a configuration the same as the configuration of the wireless electric power supply system 100, except for presence or absence of a notification apparatus 30. The notification apparatus 30 is an electronic apparatus. As one more specific example, various electronic apparatuses described regarding the electric power reception apparatus 20 can be adopted. Note that the notification apparatus 30 is separate from the electric power reception apparatus 20. As one example, the electric power reception apparatus 20 may be a wearable electronic apparatus worn by a user, such as a wristwatch-type wearable electronic apparatus and an eyeglass-type wearable electronic apparatus. In this case, the notification apparatus 30 may be a smartphone.

The notification apparatus 30 comprises a communication unit 31, a controller 32, and a notification unit 33. The communication unit (communication circuit) 31 can transmit and receive radio waves to and from the electric power transmission apparatus 10. The communication unit 31 comprises an antenna 311. A configuration of the communication unit 31 is the same as the configuration of the communication unit 11 or the communication unit 21. As a standard of wireless communication between the electric power transmission apparatus 10 and the notification apparatus 30, for example, a standard of short-range wireless communication can be adopted.

The controller 32 can integrally manage operation of the notification apparatus 30. It can also be said that the controller 32 is a control circuit. A hardware configuration of the controller 32 is the same as the hardware configuration of the controller 12 or the controller 22. Thus, repeated description will be omitted.

The notification unit 33 can perform notification to the user. A configuration of the notification unit 33 is the same as the configuration of the notification unit 14.

The controller 12 of the electric power transmission apparatus 10 can transmit an instruction signal to the notification apparatus 30 via the communication unit 11. The instruction signal instructs notification of the details described above. When the controller 32 of the notification apparatus 30 receives an instruction signal via the communication unit 31, the controller 32 of the notification apparatus 30 causes the notification unit 33 to perform notification of a detail of the instruction signal.

As in the above, the electric power transmission apparatus and the wireless electric power supply system are described in detail. However, the description above is in all aspects illustrative, and the present disclosure is not limited to the description above. Various modifications described above can be used in combination, on the condition that the combination is consistent. It is therefore understood that numerous unillustrated modifications may be assumed without departing from the scope of the present disclosure.

The invention claimed is:

1. A wireless electric power supply system comprising:
an electric power transmission apparatus;
an electric power reception apparatus; and
a notification unit, wherein
the electric power transmission apparatus comprises:
    a first antenna;
    a storage medium; and
    at least one first processor,
    the at least one first processor configured to cause the first antenna to output a second radio wave for electric power supply in response to an electric power transmission request signal, when a first radio wave including the electric power transmission request signal is received from an electric power reception apparatus via the first antenna,
    the at least one first processor configured to store information about an electric power transmission condition of the second radio wave transmitted in response to the electric power transmission request signal in the storage medium as history electric power transmission information,
    the at least one first processor configured to cause the first antenna to output the second radio wave with the electric power transmission condition based on the history electric power transmission information, irrespective of whether or not the first radio wave has been received,
the electric power reception apparatus comprises:
    a battery;
    at least one second processor configured to operate based on a direct-current voltage of the battery when a remaining amount of the battery is equal to or greater than a minimum value;
    a second antenna;
    a rectifier configured to rectify an alternating-current voltage output from the second antenna based on the second radio wave received by the second antenna, and output a rectified direct-current voltage; and a charge circuit configured to charge the battery, based on the direct-current voltage from the rectifier, wherein even in a dead battery state in which the remaining amount of the battery is lower than the minimum value, the charge circuit charges the battery, based on the direct-current voltage from the rectifier, the first antenna comprises an array antenna comprising a plurality of antenna elements, the history electric power transmission information includes a weight vector including an adjustment amount for beamforming of at least any one of amplitude and phase of the second radio wave output from the plurality of antenna elements, the at least one first processor determines the weight vector, based on a radio wave from the electric power reception apparatus, and when the determined weight vector is different from the weight vector of the history electric power transmission information, the at least one first processor causes the notification unit to perform notification of a second detail about a position of the electric power reception apparatus.

2. The wireless electric power supply system according to claim 1, further comprising wherein when the first antenna does not receive a radio wave from the electric power reception apparatus for a predetermined period of time, the at least one first processor causes the notification unit to perform notification of a first detail about a state of the electric power reception apparatus.

3. The wireless electric power supply system according to claim 2, wherein the first detail includes a detail of causing a user to confirm whether or not the electric power reception apparatus is in the dead battery state.

4. The wireless electric power supply system according to claim 1, wherein the at least one first processor determines whether or not the electric power transmission condition of the second radio wave output in response to the first radio wave is different from electric power transmission condition of the history electric power transmission information.

5. The wireless electric power supply system according to claim 4, wherein when the electric power transmission condition of the second radio wave that is used when the second radio wave is output in response to the first radio wave is different from the electric power transmission condition of the history electric power transmission information, the at least one first processor stores the electric power transmission condition of the second radio wave in the storage medium as the history electric power transmission information.

6. The wireless electric power supply system according to claim 1, wherein the second detail includes a detail of prompting a user to place the electric power reception apparatus at a position indicated by the weight vector of the history electric power transmission information.

7. The wireless electric power supply system according to claim 1, wherein the at least one first processor determines the weight vector, based on the radio wave received from the electric power reception apparatus after it is determined that the determined weight vector is different from the weight vector of the history electric power transmission information, and when the weight vector matches the weight vector of the history electric power transmission information, the at least one first processor causes the notification unit to perform notification of a third detail about a position of the electric power reception apparatus.

8. The wireless electric power supply system according to claim 7, wherein the third detail includes a detail that the electric power reception apparatus has been returned to the position indicated by the weight vector of the history electric power transmission information.

9. The wireless electric power supply system according to claim 2, wherein the notification unit is comprised in the electric power transmission apparatus.

* * * * *